United States Patent
Saito (10) Patent No.: US 10,911,688 B2
(45) Date of Patent: Feb. 2, 2021

(54) CONTROL APPARATUS, IMAGING APPARATUS, AND STORAGE MEDIUM

(71) Applicant: CANON KABUSHIKI KAISHA, Tokyo (JP)

(72) Inventor: Takao Saito, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/527,744

(22) Filed: Jul. 31, 2019

(65) Prior Publication Data

US 2020/0045215 A1  Feb. 6, 2020

(30) Foreign Application Priority Data

Jul. 31, 2018  (JP) .................................. 2018-143040

(51) Int. Cl.
*H04N 5/232* (2006.01)
*H04N 5/235* (2006.01)

(52) U.S. Cl.
CPC ................................ *H04N 5/2352* (2013.01)

(58) Field of Classification Search
CPC ........... H04N 5/23252; H04N 5/23248; H04N 5/23251; H04N 5/23258; H04N 5/23264; H04N 5/2328; H04N 5/23287; H04N 5/23212; H04N 5/23296; H04N 5/235; H04N 5/2352
USPC ....... 348/208.99, 208.2, 208.3, 208.4, 208.5, 348/208.6, 208.7, 208.11, 208.12, 208.13, 348/208.16, 154, 155, 240.99, 240.3; 396/52, 55
See application file for complete search history.

(56) References Cited

U.S. PATENT DOCUMENTS

| | | | | |
|---|---|---|---|---|
| 9,325,885 B2 * | 4/2016 | Takeuchi | ............. | H04N 5/2254 348/208.99 |
| 10,386,632 B2 * | 8/2019 | He | ......... | H04N 5/225 348/335 |
| 2006/0165398 A1 * | 7/2006 | Imada | .................... | G03B 17/00 396/55 |
| 2007/0003261 A1 * | 1/2007 | Yamasaki | ............. | G03B 17/00 396/55 |
| 2015/0062358 A1 * | 3/2015 | Takeuchi | ............. | H04N 5/2328 348/208.1 |
| 2017/0272657 A1 | 9/2017 | Ito | | |

FOREIGN PATENT DOCUMENTS

| JP | 2008035308 A | 2/2008 |
|---|---|---|
| JP | 2015115808 A | 6/2015 |
| JP | 2015219754 A | 12/2015 |

OTHER PUBLICATIONS

Extended European Search Report issued by the European Patent Office dated Nov. 28, 2019 in corresponding European Patent Application No. 19188810.6.

* cited by examiner

*Primary Examiner* — Marly S Camargo
(74) *Attorney, Agent, or Firm* — Carter, DeLuca & Farrell, LLP (57) ABSTRACT

A control apparatus includes a processor configured to function as an angle control unit configured to control a tilt angle formed by a plane orthogonal to an optical axis of an imaging optical system and an imaging plane of an image sensor, and an aperture control unit configured to control a F-number based on the tilt angle and an output signal of a vibration detection unit configured to detect a vibration.

13 Claims, 9 Drawing Sheets

CONTROL APPARATUS, IMAGING APPARATUS, AND STORAGE MEDIUM

BACKGROUND OF THE INVENTION

Field of the Invention

The present invention relates to an imaging apparatus that can provide tilt imaging.

Description of the Related Art

The vibration when applied to an imaging apparatus causes blurs and defocuses of an object image, and degrades the image quality. Thus, there is known a technique for reducing the image quality degradation induced by the vibration using the image stabilization technology such as the optical and/or electronic image stabilizations. For example, Japanese Patent Laid-Open No. ("JP") 2015-115808 discloses an imaging apparatus that sets an exposure time and a frame speed based on an amplitude of the vibration applied to the imaging apparatus and the like and reduces the image quality degradation caused by the vibration.

On the other hand, so-called tilt imaging is known that provides an object image focused in a wide range of different distances within a predetermined angle of view using a surveillance camera or the like. For example, JP 2015-219754 discloses an imaging apparatus that can easily focus on each object when the distances to the plurality of objects are different.

When the vibration is applied to an imaging apparatus that can provide the tilt imaging, the imaging view angle shifts and the object image blurs or defocuses even with the image stabilization technique. The defocus magnitude when the vibration is applied to the imaging apparatus is determined based on the amplitude of the vibration and the tilt angle.

However, the imaging apparatus disclosed in JP 2015-115808 cannot prevent the defocus because the exposure time is shortened to suppress the blurs of the object image. The imaging apparatus disclosed in JP 2015-219754 does not consider the vibration, and therefore cannot provide a sufficient effect on reducing the defocus in the tilt imaging.

SUMMARY OF THE INVENTION

The present invention provides a control apparatus, an imaging apparatus, and a storage medium (program), each of which can capture an in-focus image even when the vibration is applied during tilt imaging.

A control apparatus according to one aspect of the present invention includes a processor configured to function as an angle control unit configured to control a tilt angle formed by a plane orthogonal to an optical axis of an imaging optical system and an imaging plane of an image sensor, and an aperture control unit configured to control a F-number based on the tilt angle and an output signal of a vibration detection unit configured to detect a vibration.

A control apparatus according to one aspect of the present invention includes an angle control unit configured to control a tilt angle formed by a plane orthogonal to an optical axis of an imaging optical system and an imaging plane of an image sensor, and a zoom control unit configured to control an optical zoom value based on the tilt angle and an output signal of a vibration detection unit configured to detect a vibration.

An imaging apparatus including the above control apparatus and a non-transitory computer-readable storage medium storing a control method similar to the control apparatus constitute another aspect of the present invention.

Further features of the present invention will become apparent from the following description of exemplary embodiments with reference to the attached drawings.

DESCRIPTION OF THE EMBODIMENTS

Referring now to the accompany drawings, a detailed description will be given of various embodiments according to the present invention.

First Embodiment

Figure 1:
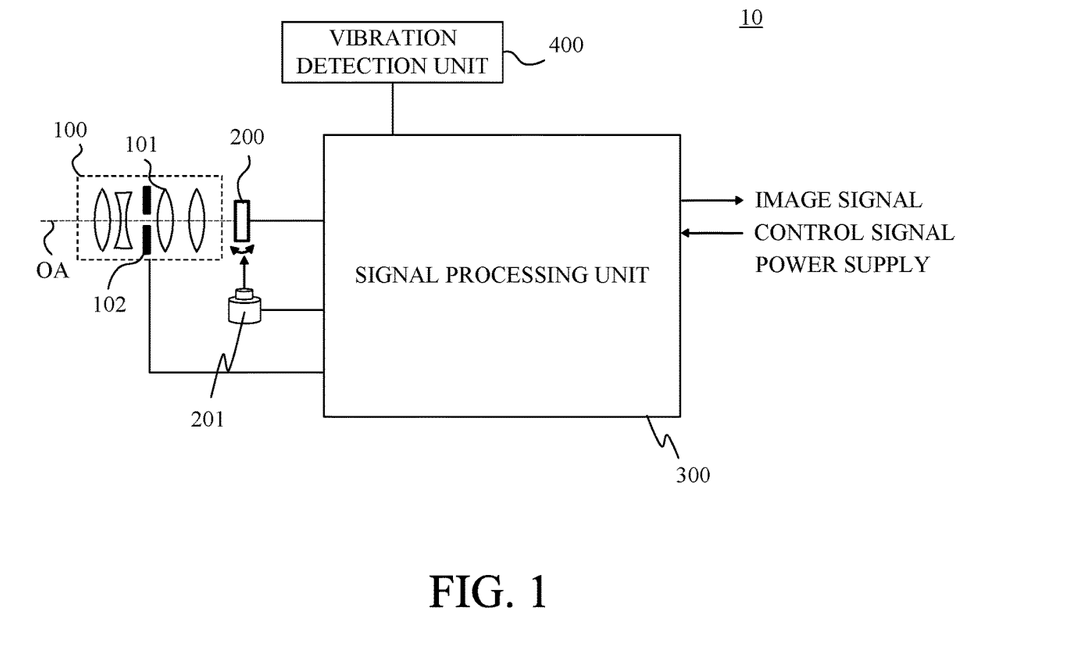
FIG. 1 is a schematic view of an imaging apparatus according to each embodiment.

Referring now to FIG. 1, a description will be given of a configuration of an imaging apparatus according to a first embodiment of the present invention. FIG. 1 is a schematic view of an imaging apparatus 10. A lens unit (imaging optical system) 100 includes a zoom lens unit 101 and a diaphragm (aperture stop) unit 102. The lens unit 100 further includes a focus lens, and can obtain optimally shaped light from an object. The zoom lens unit 101 can vary an imaging magnification. The diaphragm unit 102 controls a light amount incident on an image sensor 200. The lens unit 100 is not limited to the configuration illustrated in FIG. 1. In FIG. 1, the lens unit 100 includes both of the zoom lens unit 101 and the diaphragm unit 102, but the present invention is not limited to this example, and at least one of the zoom lens unit 101 and the diaphragm unit 102 may be used. The lens unit (imaging optical system) 100 may be of a removable interchangeable lens type.

The image sensor 200 includes a semiconductor device, such as a CMOS sensor and a CCD sensor, and a peripheral circuit thereof. The image sensor 200 photoelectrically converts an object image (optical image) formed through the lens unit 100, and outputs an electrical signal (pixel signal). A signal processing unit 300 performs predetermined signal processing for an electrical signal output from the image sensor 200 based on a control signal from a system controller (not shown), such as a camera CPU, and outputs an image signal. The power is supplied to the signal processing unit 300 from a power supply unit (not shown). This embodiment directly transfers the pixel signal from the image sensor 200 to the signal processing unit 300, but the present invention is not limited to this embodiment. The image sensor 200 may perform internal signal processing before transferring the pixel signal to the signal processing unit 300.

A motor (sensor tilt motor) 201 changes an angle between a light receiving surface (imaging plane) of the image sensor 200 and a plane orthogonal to an optical axis OA of the lens unit 100 based on a drive signal from the signal processing unit 300. Although only one motor is illustrated as the motor 201 in FIG. 1, the present invention is not limited to this embodiment and may two-dimensionally change the angle using a plurality of motors.

The imaging apparatus 10 includes a vibration detection unit 400. The vibration detection unit 400 detects the vibration magnitude applied to the imaging apparatus 10 and converts it into an electrical signal. The vibration detection unit 400 includes an acceleration sensor, an angular velocity sensor, or the like, and may be disposed so that it can detect the vibration along the optical axis OA of the imaging apparatus 10.

Figure 2:
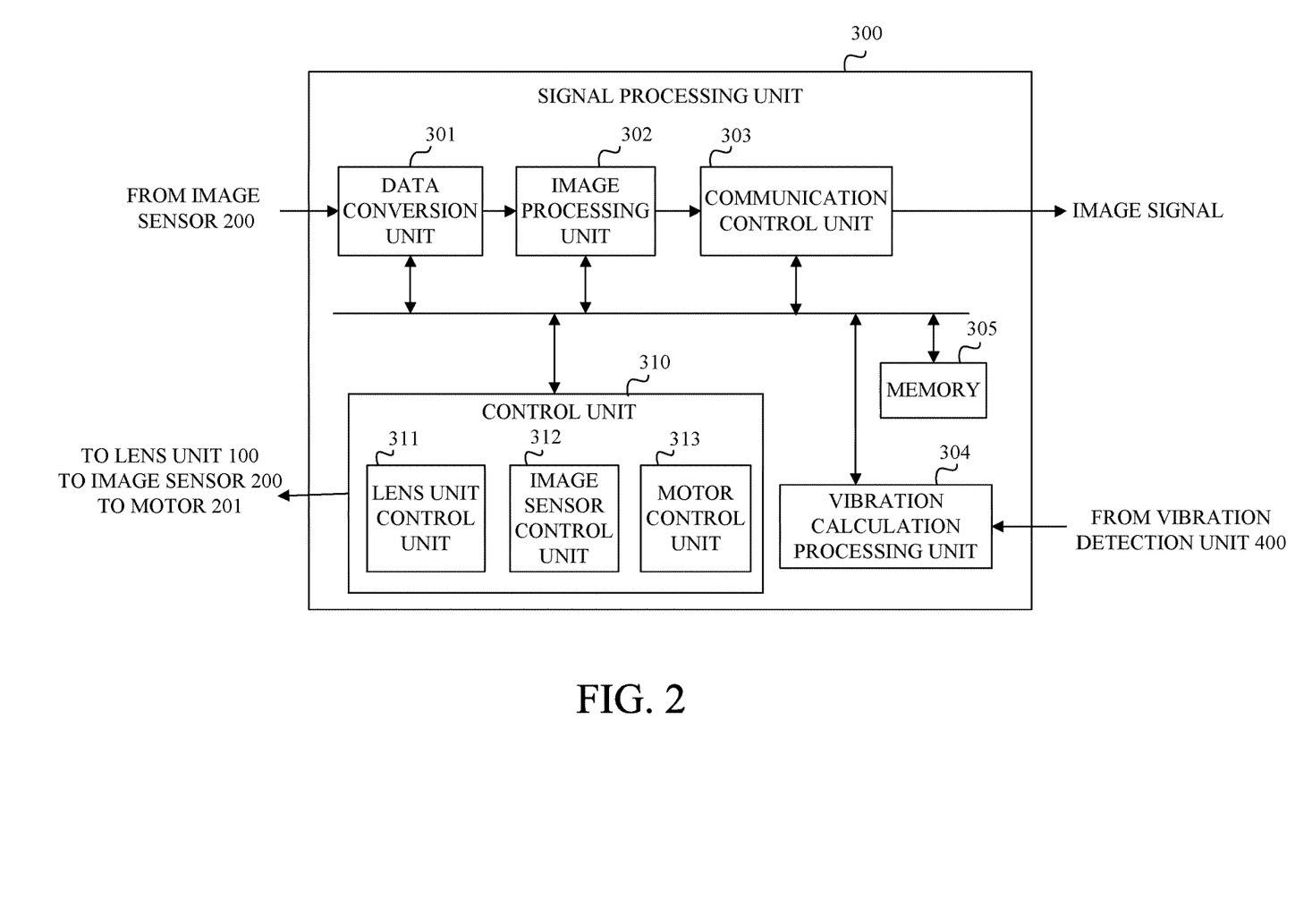
FIG. 2 is a block diagram of a signal processing unit according to each embodiment.

Referring now to FIG. 2, a description will be given of a configuration of the signal processing unit 300. FIG. 2 is a block diagram of the signal processing unit 300. The signal processing unit 300 includes a data conversion unit 301, an image processing unit 302, a communication control unit 303, a vibration calculation processing unit 304, a memory 305, and a control unit 310. The control unit 310 includes a lens unit control unit 311, an image sensor control unit 312, and a motor control unit 313.

The data conversion unit 301 converts the pixel signal from the image sensor 200 into a signal suitable for image processing. The image processing unit 302 performs correction processing and development processing for an output signal of the data conversion unit 301, and outputs an image signal. The communication control unit 303 outputs the image signal from the image processing unit 302 to the outside as image data. The control unit 310 controls each component in the signal processing unit 300 such as the data conversion unit 301 and the image processing unit 302. The control unit 310 (lens unit control unit 311, image sensor control unit 312, and motor control unit 313) controls the lens unit 100, the image sensor 200, and the motor 201 so that the object can be imaged with a variety of settings using pixel signals or image signals. When the control unit 310 changes the luminance of the object image, the control unit 310 changes the shutter time of the image sensor 200, the gain setting, and the setting of the diaphragm unit 102 based on the luminance signal of the image and the current settings of the image sensor 200 and the lens unit 100. Thereby, the control unit 310 can adjust the luminance of the image signal. When varying the magnification of the object image, the control unit 310 changes the setting of the zoom lens unit 101 and the focal length of the lens unit 100. Thereby, the control unit 310 can adjust the angle of view of the imaging apparatus 10 to change the magnification of the object image.

A vibration calculation processing unit 304 calculates an angular displacement amount and a period of the vibration based on the vibration signal obtained from the vibration detection unit 400. The signal processing unit 300 can implement so-called electronic image stabilization processing that cuts out part of the angle of view region of the image signal based on the angular displacement amount and period of the vibration, and changes the position of the cutout area in accordance with the angular displacement amount, thereby maintaining the relative position of the object. The memory 305 stores data such as predetermined settings and operational programs. The control unit 310 can read out the data stored in the memory 305 as necessary. The image processing unit 302 may include an object detection unit that detects a range in which an object exists from the obtained image signal.

Figure 3A:
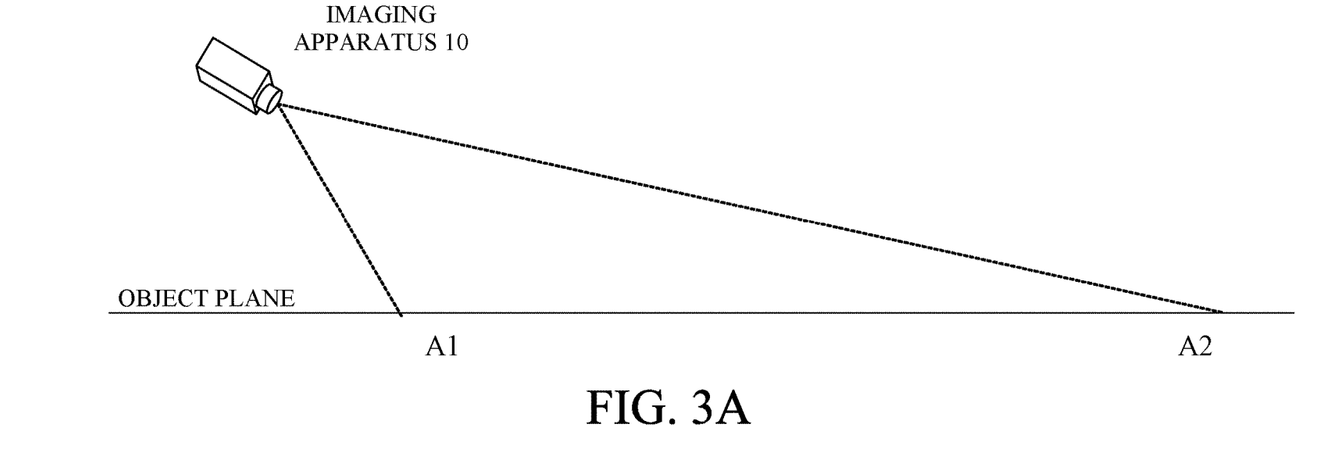
FIGS. 3A and 3B are explanatory views of tilt imaging according to each embodiment.
Figure 3B:
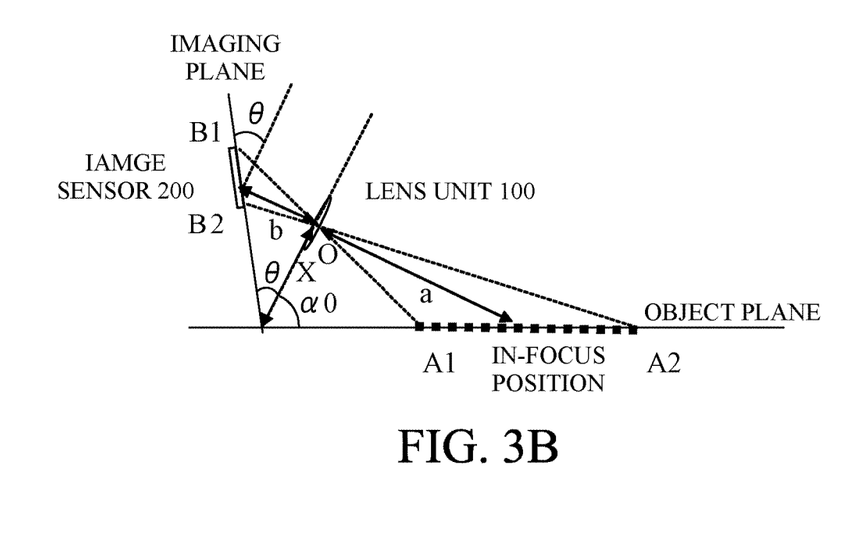

Referring now to FIGS. 3A and 3B, a description will be given of tilt imaging that drives the motor 201, tilts the light receiving surface (imaging plane) of the image sensor 200 and the plane orthogonal to the optical axis OA of the lens unit 100 from the parallel state. FIGS. 3A and 3B are explanatory diagrams when the object is imaged using the imaging apparatus 10. FIG. 3A illustrates that an object (object plane) on a plane not orthogonal to the optical axis OA of the imaging apparatus 10. In FIG. 3A, the imaged range is defined between points A1 and A2 on the object plane. FIG. 3B is a schematic view showing the positional relationship between the lens unit 100 and the image sensor 200 in imaging in FIG. 3A.

As illustrated in FIG. 3B, the lens unit 100 and the image sensor 200 are arranged such that the object plane, the principal plane of the lens unit 100, and the imaging plane of the image sensor 200 intersect at one point. This configuration enables an in-focus image to be captured between corresponding points B1 and B2 on the imaging plane in the overall imaging range between points A1 and A2 on the object plane according to the principle of shine proofing. Assume that "a" is a distance from each of points A1-A2 on the object plane to a center O of the principal plane of the lens unit 100, and "b" is a distance between the lens unit 100 and each of the points B1-B2 on the imaging plane of the image sensor 200 on which the object image is formed, and "f" is a focal length of the lens unit 100. At this time, the distances "a" and "b" and the focal length "f" satisfy the following expression (1) which is the lens formula.

$$\frac{1}{a} + \frac{1}{b} = \frac{1}{f} \qquad (1)$$

Now assume that with respect to the distance b, a tilt angle θ is an angle at which the image sensor 200 inclines to the plane parallel to the principal plane of the lens unit 100. At this time, the distance b can be expressed as a function of the tilt angle θ at all points in the range of the points B1-B2 on the imaging plane. Thus, the distance "a" to the object to be focused on each position of the imaging plane at the focal length f can be uniquely determined by determining the tilt angle θ.

Figure 4A:
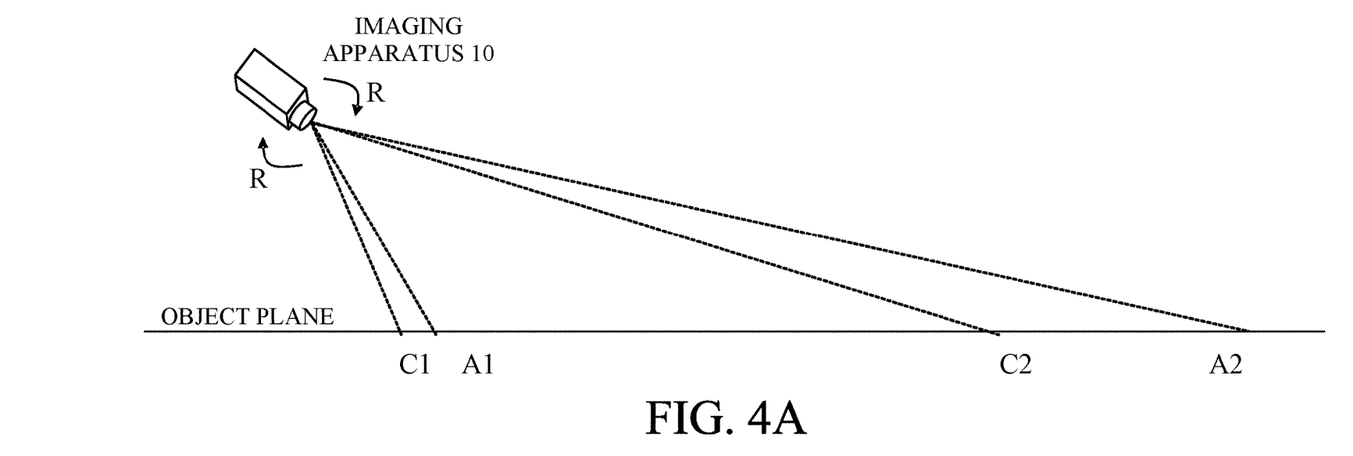
FIGS. 4A and 4B are explanatory diagrams of the tilt imaging when the vibration is applied to the imaging apparatus according to each embodiment.
Figure 4B:
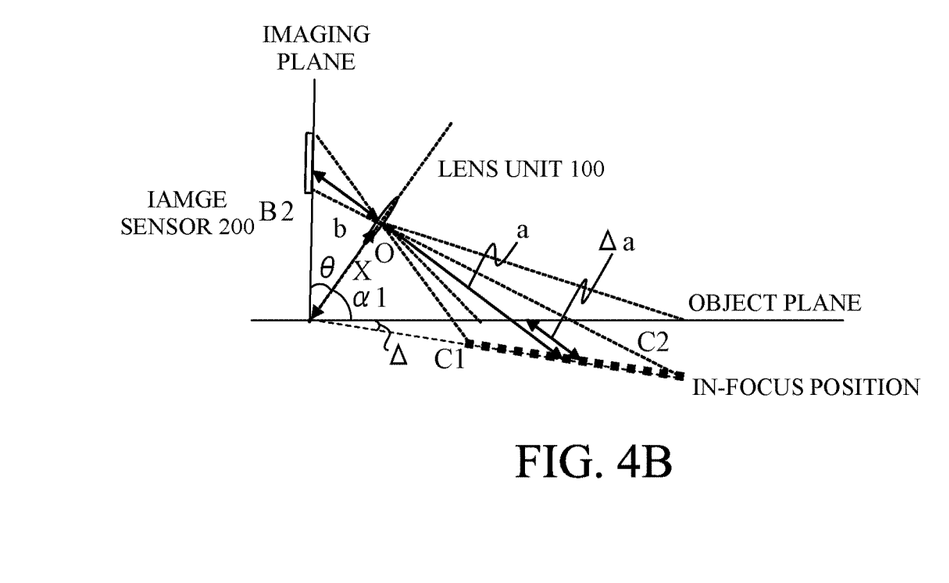

Referring now to FIGS. 4A and 4B, a description will be given of a case where an external force caused by the vibration is applied to the imaging apparatus 10 and an angle of view changes in imaging. FIGS. 4A and 4B are explanatory views when the direction of the imaging apparatus 10 is changed in an arrow R direction by applying the vibration to the imaging apparatus 10 from the state in FIGS. 3A and 3B. FIG. 4A illustrates that the object (object plane) is imaged when the direction of the imaging apparatus 10 changes in the arrow R direction. In FIG. 4A, the imaging range is defined between points C1 and C2 on the object plane. FIG. 4B is a schematic view showing the positional relationship between the lens unit 100 and the image sensor 200 in imaging in FIG. 4A.

As the orientation of the imaging apparatus 10 changes, the imaging range changes from the range between the points A1 and A2 to the range between the points C1 and C2. Thus, with respect to the distance "a" to the object captured at the same position of the imaging apparatus 10, the distance between A1-O changes to the distance between C1-O and the distance between A2-O changes to the distance between C2-O. On the other hand, the positional relationship does not change between the image sensor 200 and the lens unit 100. Thus, the distance b between the image sensor 200 and the lens unit 100, such as the distance between B1-O and the distance B2-O, is the same as the pre-change distance. As a result, the in-focus position shifts from the object plane, and does not satisfy the expression (1). The variation amount Δa of the distance "a" caused by the vibration is obtained based on the installation condition of the imaging apparatus 10 and the variation amount of the angle of view. The variation amount of the angle of view is determined based on the angular displacement amount of the vibration. This configuration enables the variation amount Δa of the distance "a" to be calculated by measuring the vibration.

Referring now to FIGS. 3B and 4B, the variation amount Δa of the distance is expressed as in the following expression (2).

$$\Delta a = b \cdot \frac{\tan \alpha 0 - \tan(\alpha 0 - \delta)}{\tan \theta} \quad (2)$$
$$= a - \frac{b \cdot \tan(\alpha 0 - \delta)}{\tan \theta}$$

In FIG. 3B, since tan θ=b/X and tan α0=a/X, tan α0=a·tan θ/b is established. Similarly, in FIG. 4B, tan α1=(a−Δa)·tan θ/b. Assume that Δ is an angular displacement amount caused by the vibration. Then, since α1=α0−Δ, Δa can be expressed with θ and Δ as in the expression (2). Since tan α0=a·tan θ/b, the expression (2) can be expressed as the following equation (2a) without using α0.

$$\Delta a = \frac{a - b\left(\frac{\tan \delta}{\tan \theta}\right)}{1 - \frac{a}{b}\tan\theta\tan\delta} \quad (2a)$$

In this embodiment, the image sensor 200 has a structure in which the light receiving elements are periodically arranged. Thus, in the image sensor 200, there is an upper limit of the resolution determined by the arrangement interval of the light receiving elements. This is called a permissible circle of confusion δ. Even if the object image is formed in a range of the permissible circle of confusion δ instead of one point, it can be regarded as the in-focus state. In other words, even if the distance from the lens unit 100 to the object shifts from the distance "a," it looks as if the in-focus state is maintained. This permissible defocus amount is called a depth of field d. The depth of field d is expressed as the following expressions (3) and (4) with a depth of field $d_1$ on the near side and a depth of field $d_2$ on the far side in the depth direction.

$$d_1 = \frac{\delta \cdot Fno \cdot a^2}{f^2 - \delta \cdot Fno \cdot a} \quad (3)$$

$$d_2 = \frac{\delta \cdot Fno \cdot a^2}{f^2 + \delta \cdot Fno \cdot a} \quad (4)$$

In the expressions (3) and (4), Fno is the F-number (aperture value) of the lens unit 100, "a" is a distance between the lens unit 100 and the object, and "f" is a focal length of the lens unit 100.

Figure 5A:
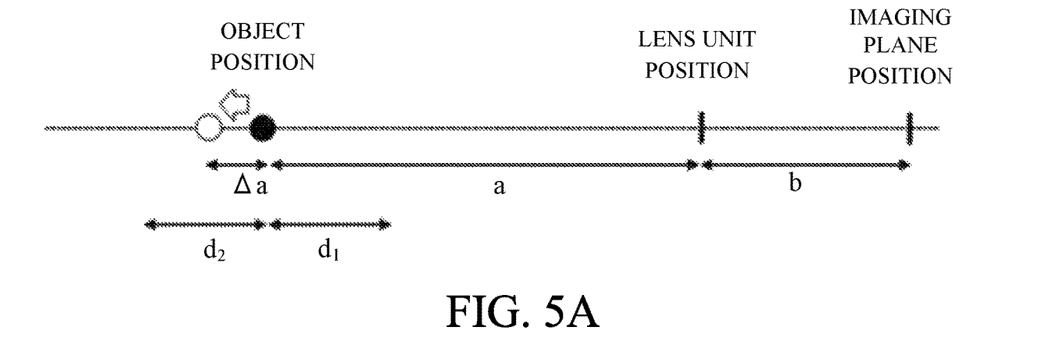
FIGS. 5A-5C are diagrams showing the relationship between a variation amount $\Delta a$ of a distance "a" and depths of field $d1$ and $d2$ when the vibration is applied to the imaging apparatus according to each embodiment.
Figure 5B:
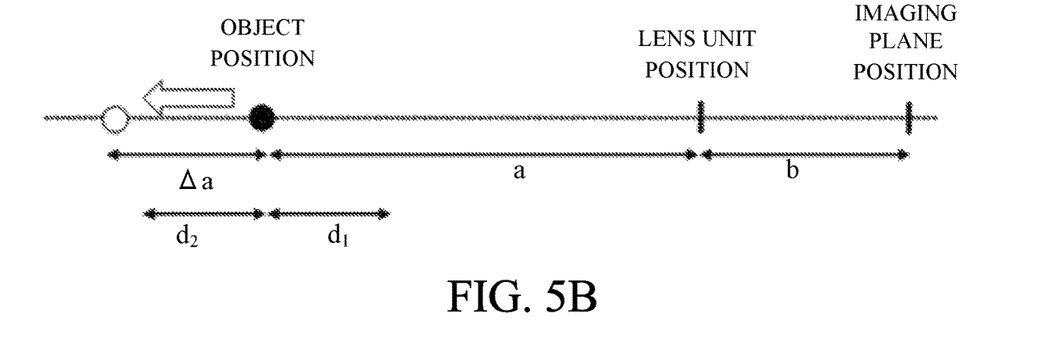
Figure 5C:
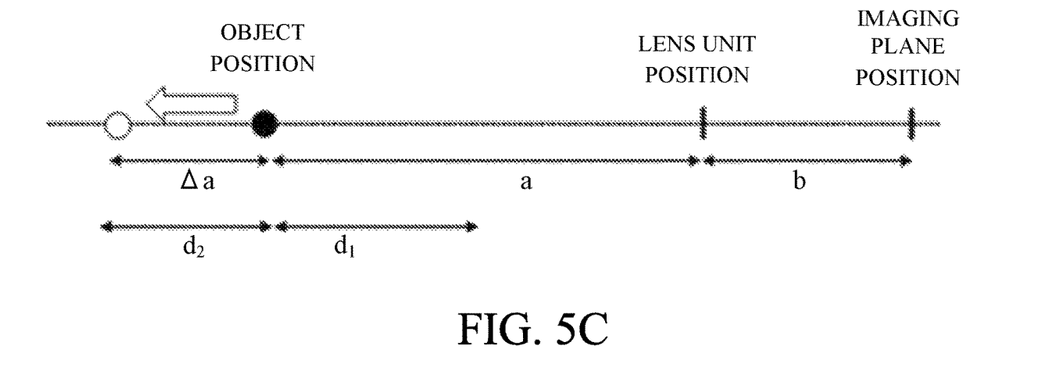

Referring now to FIGS. 5A-5C, a description will be given of a relationship between the variation amount Δa of the distance "a" caused by the vibration applied to the imaging apparatus 10 and the depth of field $d_2$. FIGS. 5A-5C illustrate the relationship between the variation amount Δa of the distance "a" caused by the vibration and the depth of field $d_2$. FIG. 5A illustrates that the variation amount Δa of the distance "a" to the object is smaller than the depth of field $d_2$ when the vibration is applied to the imaging apparatus 10. FIG. 5B illustrates that the variation amount Δa of the distance "a" to the object is larger than the depth of field $d_2$ when the vibration is applied to the imaging apparatus 10. FIG. 5C illustrates that the depth of field $d_1$ or $d_2$ is made larger by controlling (changing) the focal length f or F-number (aperture value), and consequently the variation amount Δa of the distance "a" is smaller than the post-change depth of field $d_2$.

As illustrated in FIG. 5A, when the variation amount Δa of the distance "a" to the object is smaller than the depth of field $d_2$ and the vibration is applied to the imaging apparatus 10, it can be regarded as the in-focus state. On the other hand, as illustrated in FIG. 5B, when the variation amount Δa of the distance "a" is larger than the depth of field $d_2$, the state is the defocus state. However, controlling (changing) the focal length f or F-number can make larger the depths of field $d_1$ and $d_2$ as illustrated in FIG. 5C. In other words, controlling (changing) the focal length f or F-number can keep the in-focus state. Herein, although the variation amount Δa of the distance "a" differs depending on the distances, each relative position does not change. Thus, once the variation amount Δa can be found for one certain point, the variation amount Δa can be calculated for another point.

In order to change the focal length f or F-number, it is generally necessary to apply a change that affects the captured image to the imaging apparatus 10, such as changing the optical zoom value and the F-number. Thus, it is necessary to calculate a proper optical zoom variation amount and aperture variation amount for the vibration applied to the imaging apparatus 10. Herein, if the focal length for F-number is changed by changing the optical zoom value or the F-number, the luminance or the angle of view of the captured image changes. Thus, simultaneous processing may be made such as adjusting the luminance by changing the exposure time or gain and cutting out only the area in the original angle of view using the electronic zoom. Since the degradation from the original image quality is likely to stand out in changing them, a threshold may be provided to the optical zoom value and the F-number, or a threshold may be provided to the variation amount. Since it is undesirable to frequently change the optical zoom value and the F-number, the optical zoom value and the F-number may not be changed for a predetermined period after each value is changed.

Figure 6:
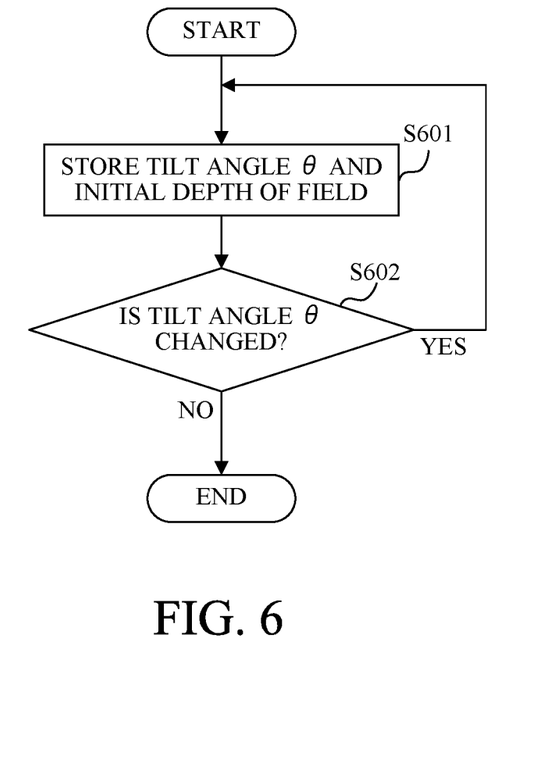
FIG. 6 is a flowchart of storage processing before the vibration is applied to the imaging apparatus according to each embodiment.

Referring now to FIG. 6, a description will be given of storage processing before the vibration is applied to the imaging apparatus 10 (before the vibration detection unit 400 detects the vibration). FIG. 6 is a flowchart showing the storage processing before the vibration is applied to the imaging apparatus 10. Each step in FIG. 6 is mainly executed by the control unit 310 in the signal processing unit 300. In this embodiment, the lens unit 100 includes the diaphragm unit 102 that adjusts the aperture value (F-number). The imaging apparatus 10 tilts the image sensor 200 by the tilt angle θ for the tilt imaging. The vibration detection unit 400 has an angular velocity sensor, and can measure an angular displacement amount caused by the vibration applied to the imaging apparatus 10.

Initially, in the step S601, the control unit 310 calculates the depths of field $d_1$ and $d_2$ (initial depths of field) of the imaging apparatus 10 in a state where there is no vibration (where the vibration detection unit 400 does not detect the vibration) based on the tilt angle θ. Then, the control unit 310 instructs the memory 305 to store the depths of field $d_1$ and $d_2$ together with the tilt angle θ.

Next, in the step S602, the control unit 310 determines whether or not the tilt angle θ has been changed from the value stored in the memory 305 in the step S601. If the tilt angle θ is changed, the flow returns to the step S601. Then, the control unit 310 calculates an initial depth of field (depths of field $d_1$ and $d_2$) of the imaging apparatus 10 based on the changed tilt angle θ. On the other hand, when the tilt angle is not changed in the step S602, this flow ends.

Figure 7:
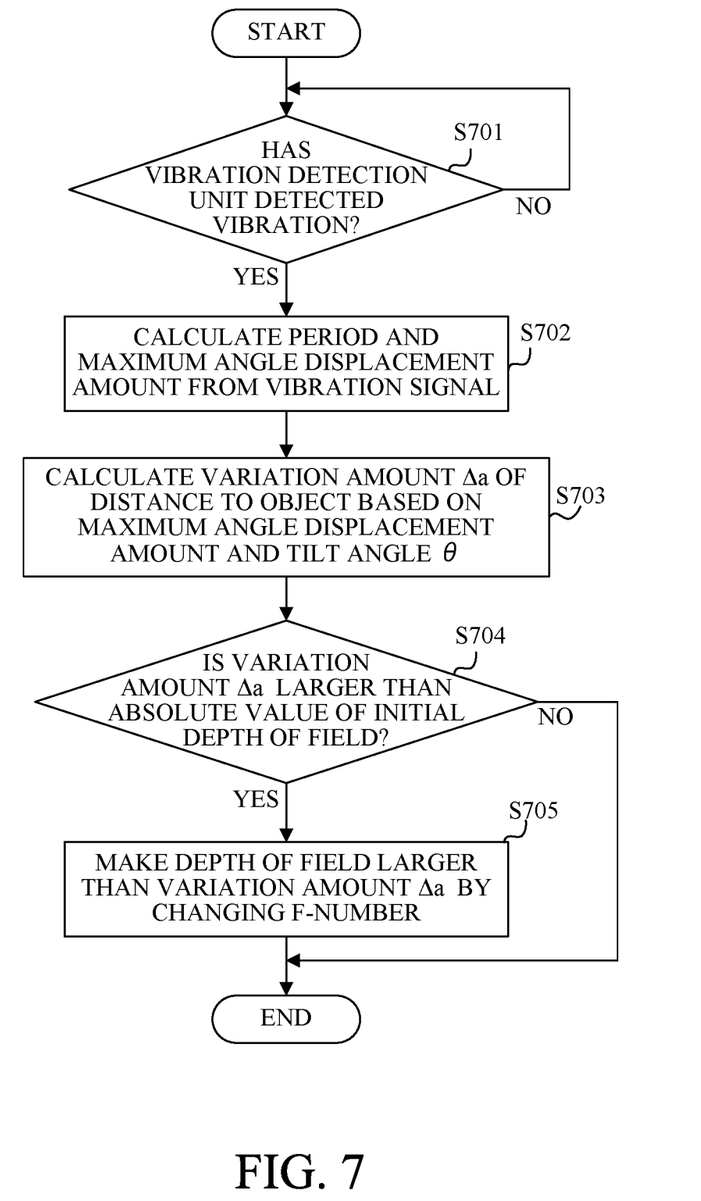
FIG. 7 is a flowchart of a defocus preventive operation according to a first embodiment.

Referring now to FIG. 7, a description will be given of the defocus preventive operation of the imaging apparatus 10 according to this embodiment. FIG. 7 is a flowchart of the defocus preventive operation according to this embodiment. Each step in FIG. 7 is mainly executed by the control unit 310 in the signal processing unit 300.

Initially, in the step S701, the control unit 310 (or vibration calculation processing unit 304) determines whether or not the vibration detection unit 400 has detected the vibration. If the vibration detection unit 400 does not detect the vibration, the determination in the step S701 is repeated. On the other hand, when the vibration detection unit 400 detects the vibration, the flow proceeds to the step S702.

In the step S702, the control unit 310 uses the vibration calculation processing unit 304 to calculate the period of the vibration and the maximum angular displacement amount within the period from the output signal of the vibration detection unit 400. Next, in the step S703, the control unit 310 calculates the variation amount Δa of the distance to the object based on the maximum angular displacement amount calculated in the step S702 and the tilt angle θ stored in the memory 305 in the step S601 in FIG. 6 using the vibration calculation processing unit 304.

Next, in the step S704, the control unit 310 determines whether or not the variation amount Δa calculated in the step S703 is larger than the absolute value of the initial depth of field (depth of field $d_2$) stored in the step S601. If the variation amount Δa is less than the absolute value of the initial depth of field, this flow ends. On the other hand, if the variation amount Δa is larger than the absolute value of the initial depth of field, the flow proceeds to the step S705. In the step S705, the control unit 310 reduces the aperture diameter (aperture amount) of the diaphragm unit 102 by increasing the aperture value (F-number) so that the depth of field $d_2$ becomes larger than the variation amount Δa, and ends this flow.

This embodiment can provide an imaging apparatus that can capture an in-focus image even when the vibration is applied in the tilt imaging.

Second Embodiment

Figure 8:
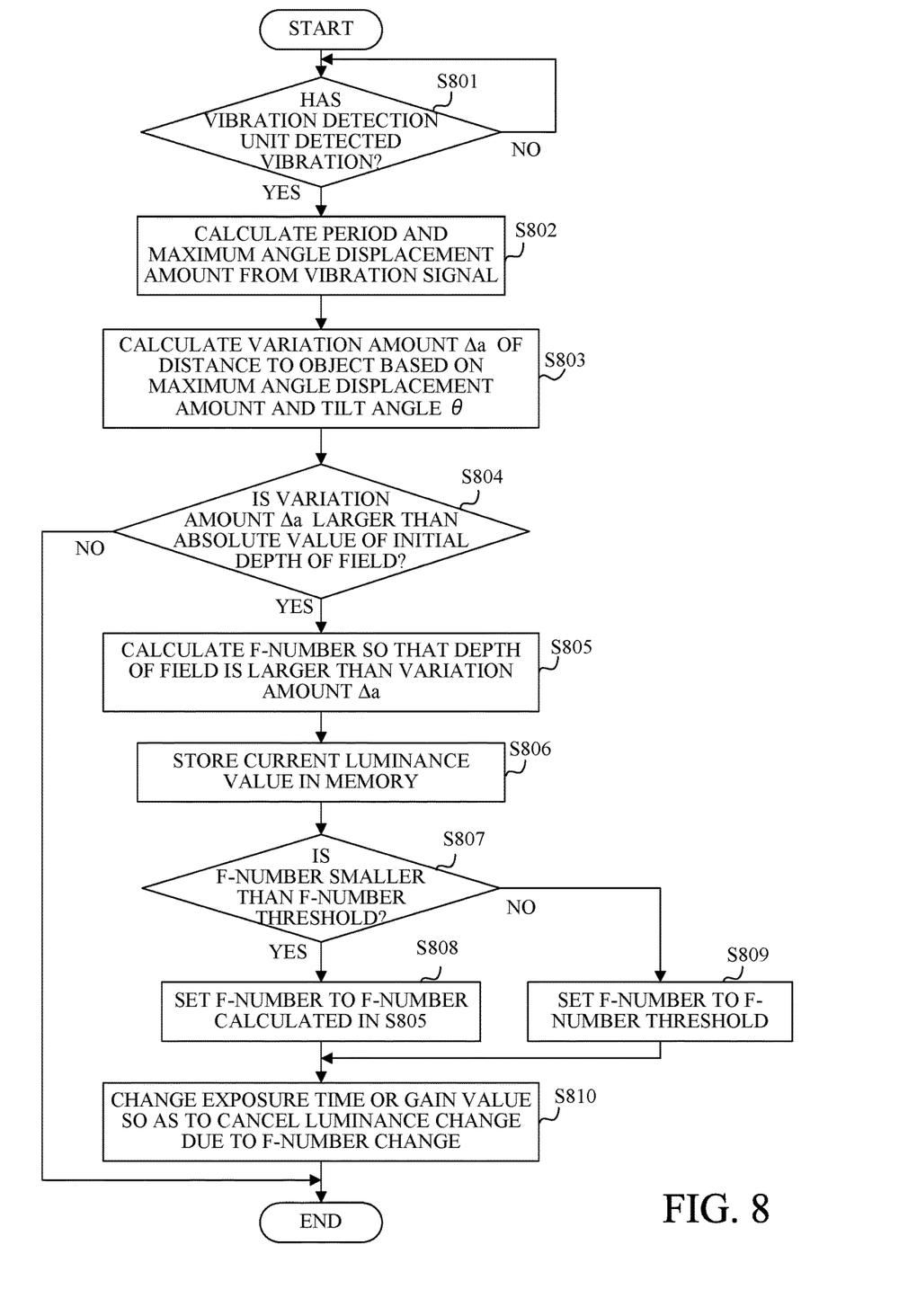
FIG. 8 is a flowchart of a defocus preventive operation according to a second embodiment.

Referring now to FIG. 8, a description will be given of a defocus preventive operation of the imaging apparatus 10 according to a second embodiment of the present invention. FIG. 8 is a flowchart of the defocus preventive operation according to this embodiment. Each step in FIG. 8 is mainly executed by the control unit 310 in the signal processing unit 300. The memory 305 in this embodiment stores the F-number threshold (predetermined threshold).

The steps S801 to S804 in FIG. 8 are the same as the steps S701 to S704 in FIG. 7 in the first embodiment. If the variation amount Δa is larger than the absolute value of the initial depth of field in the step S804, the flow proceeds to the step S805. In the step S805, the control unit 310 calculates an aperture value (F-number) such that the depth of field $d_2$ becomes larger than variation amount Δa.

Next, in the step S806, the control unit 310 instructs the memory 305 to store the current luminance value of the object image. Next, in the step S806, the control unit 310 determines whether the aperture value (F-number) calculated in the step S805 is smaller than the F-number threshold stored in the memory 305. If the F-number calculated in the step S805 is smaller than the F-number threshold, the flow proceeds to the step S808. On the other hand, if the F-number calculated in the step S805 is equal to or larger than the F-number threshold, the flow proceeds to the step S809.

In the step S808, the control unit 310 sets (changes) the F-number of the imaging apparatus 10 to the F-number calculated in the step S805, and the flow proceeds to the step S810. In the step S809, the control unit 310 causes the memory 305 to store the current luminance value of the object. Then, the control unit 310 sets (changes) the F-number of the imaging apparatus 10 as the F-number threshold, and proceeds to the step S810. In the step S810, the control unit 310 sets the exposure time or the gain value of the imaging apparatus 10 so as to provide the luminance value stored in the step S808 or S809. In other words, the control unit 310 changes the exposure time or the gain value so as to cancel the change in luminance due to the change in the F-number. More specifically, as the F-number is increased, the aperture of the diaphragm unit 102 reduces and the luminance value becomes smaller. Therefore, in the step S810, the exposure time is made longer or the gain value is made larger so as to increase the luminance value. Thereafter, the flow ends.

This embodiment can capture an in-focus image even when the vibration is applied during tilt imaging, and suppress the brightness change of the obtained image and the image quality deterioration.

Third Embodiment

Figure 9:
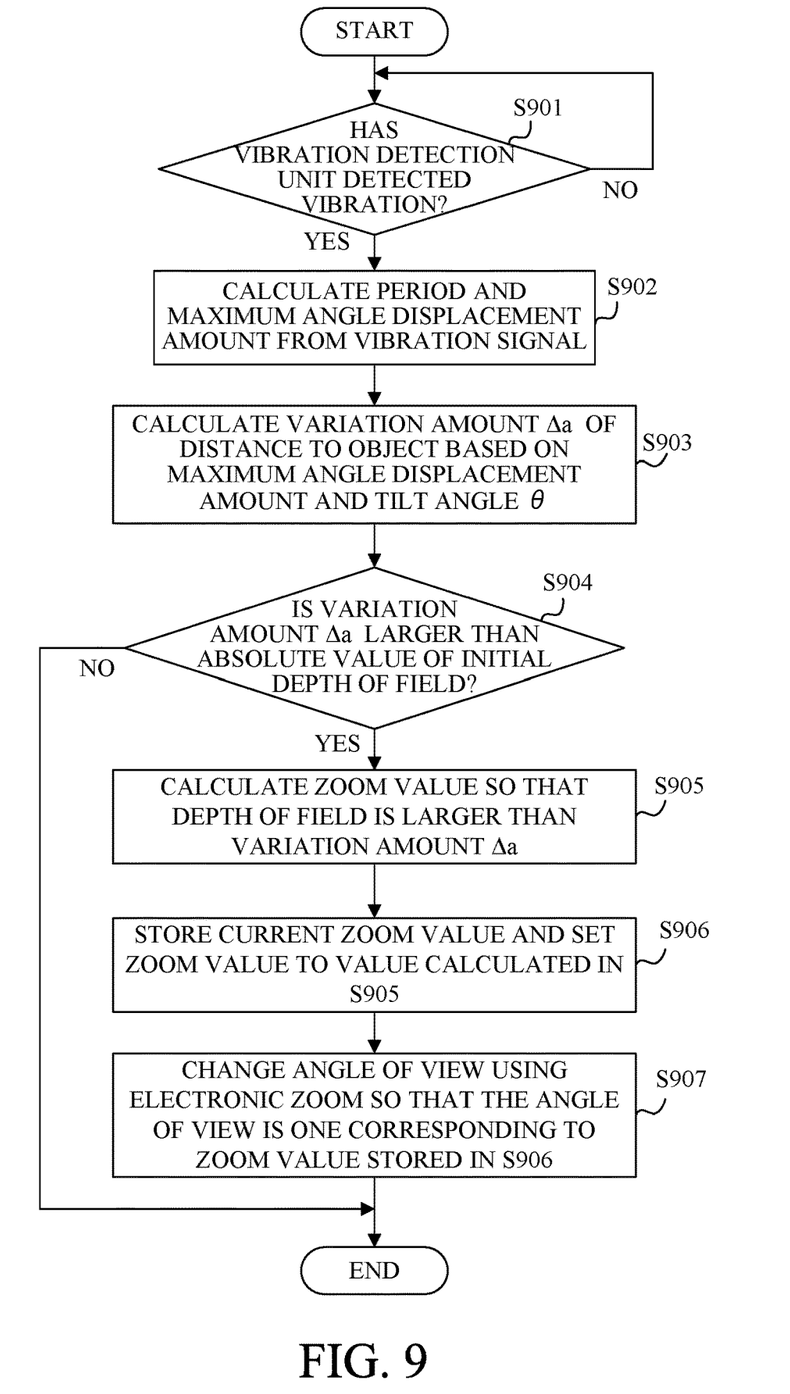
FIG. 9 is a flowchart of a defocus preventive operation according to a third embodiment.

Referring now to FIG. 9, a description will be given of defocus preventive operation of the imaging apparatus 10 according to a third embodiment of the present invention. FIG. 9 is a flowchart of the defocus preventive operation according to this embodiment. Each step in FIG. 9 is mainly executed by the control unit 310 in the signal processing unit 300. In this embodiment, the lens unit 100 includes the zoom lens unit 101 that performs optical zoom imaging.

The steps S901 to S904 in FIG. 9 are the same as the steps S701 to S704 in FIG. 7 in the first embodiment. If the variation amount Δa is larger than the absolute value of the initial depth of field in the step S904, the flow proceeds to the step S905. In the step S905, the control unit 310 calculates a zoom value (optical zoom value, focal length f) that enables the depth of field $d_2$ to be larger than the variation amount Δa.

Next, in the step S906, the control unit 310 causes the memory 305 to store the current zoom value (first zoom value) of the imaging apparatus 10. Then, the control unit 310 sets the zoom value to the zoom value (second zoom value) calculated in the step S905. Next, in the step S907, the control unit 310 changes the angle of view using the electronic zoom so as to provide the angle of view corresponding to the zoom value (first zoom value) stored in the step S906. Thereafter, the flow ends.

This embodiment stores a predetermined optical zoom value (predetermined focal length) in the memory 305, and the control unit 310 (zoom control unit) may control an optical zoom value so that it does not exceed the predetermined optical zoom value.

This embodiment can provide an imaging apparatus that can capture an in-focus image even when the vibration is applied in the tilt imaging, and suppress a change in the angle of view of the obtained image.

Thus, in each embodiment, the control apparatus (signal processing unit 300) includes an angle control unit (motor control unit 313) and an aperture control unit (lens unit control unit 311). The angle control unit controls a tilt angle θ formed between a plane orthogonal to the optical axis of the imaging optical system (lens unit 100) and the imaging plane of the image sensor 200. The aperture control unit controls the aperture value (F-number) based on the tilt angle and the output signal of the vibration detection unit (vibration detection unit 400) for detecting the vibration.

The aperture control unit may calculate the variation amount Δa of the distance to the object based on the output signal of the vibration detection unit and the tilt angle, and changes the F-number based on the variation amount Δa of the distance. When the variation amount Δa in the distance is larger than the F-number of the depth of field $d_2$, the aperture control unit changes the F-number so that the absolute value of the depth of field is larger than the variation amount (steps S704 and S705).

The aperture control unit may calculate an angular displacement amount (which may be a maximum angular displacement amount) based on the output signal of the vibration detection unit. When the angular displacement amount is the first angular displacement amount, the aperture control unit may control the aperture diameter of the diaphragm of the imaging optical system to the first aperture. In addition, when the angular displacement amount is a second angular displacement amount larger than the first angular displacement amount, the aperture control unit may control the aperture diameter of the diaphragm to a second diameter smaller than the first aperture diameter (step S705). The control apparatus may further include an exposure adjustment unit (control unit 310) that adjusts the exposure time or the gain value in accordance with the variation amount of the aperture diameter of the diaphragm (step S810). The control apparatus may further include a memory (memory 305) configured to store a predetermined F-number (F-number threshold), and the aperture control unit may control the F-number so that it does not to exceed the predetermined F-number (steps S806 to S809).

In each embodiment, the control apparatus includes the zoom control unit (lens unit control unit 311) configured to control the optical zoom value (focal length f) based on the tilt angle and the output signal of the vibration detection unit configured to detect the vibration. The zoom control unit may calculate the variation amount Δa of the distance to the object based on the output signal of the vibration detection unit and the tilt angle, and changes the optical zoom value based on the variation amount Δa of the distance. When the variation amount of the distance is larger than the absolute value of the depth of field, the zoom control unit may change the optical zoom value such that the absolute value of the depth of field is larger than the variation amount (step S905).

The zoom control unit may calculate an angular displacement amount based on an output signal of the vibration detection unit. When the angular displacement amount is the first angular displacement amount, the zoom control unit may control the optical zoom value to the first optical zoom value. When the angular displacement amount is a second angular displacement amount larger than the first angular displacement amount, the zoom control unit may control the optical zoom value to a second optical zoom value on the wide-angle side of the first optical zoom value (step S905).

The control apparatus may include an electronic zoom magnification adjustment unit (control unit 310) configured to adjust the electronic zoom magnification according to the variation amount of the optical zoom value (step S907). The memory may store a predetermined optical zoom value, and the zoom control unit may control the optical zoom value so that it does not exceed the predetermined optical zoom value. The optical zoom value may be data relating to the focal length of the imaging optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a control apparatus, an imaging apparatus, and a storage medium (program), each of which can capture an in-focus image even when the vibration is applied during tilt imaging.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-143040, filed on Jul. 31, 2018, which is hereby incorporated by reference herein in its entirety.

What is claimed is:

1. An imaging apparatus comprising:
an imaging optical system;
an image sensor;
a hardware processor; and
a memory for storing instructions to be executed by the hardware processor, wherein, when the instructions stored in the memory are executed by the hardware processor, the imaging apparatus functions as:
an angle control unit configured to control the imaging optical system or the image sensor to change a tilt angle formed by a plane orthogonal to an optical axis of the imaging optical system and an imaging plane of the image sensor;
a vibration detection unit configured to detect a vibration of the imaging apparatus;
an aperture control unit configured to control a diaphragm value; and
a calculation unit configured to calculate a change amount of a distance to an object based on the tilt angle and an output signal corresponding to the vibration detected by the vibration detection unit,
wherein the aperture control unit changes the diaphragm value, when the change amount of the distance is larger than an absolute value of a depth of field, so that the absolute value of the depth of field is larger than the change amount.

2. The imaging apparatus according to claim 1, wherein the aperture control unit calculates an angular displacement amount based on the output signal of the vibration detection unit.

3. The imaging apparatus according to claim 2, wherein the aperture control unit controls an aperture of a diaphragm in the imaging optical system to a first aperture when the angular displacement amount is a first angular displacement amount, and controls the aperture of the diaphragm to a second aperture smaller than the first aperture when the angular displacement amount is a second angular displacement amount larger than the first angular displacement amount.

4. The imaging apparatus according to claim 3, further comprising an exposure adjustment unit configured to adjust an exposure time or a gain value in accordance with a change amount of the aperture of the diaphragm.

5. The imaging apparatus according to claim 1, further comprising a memory configured to store a predetermined F-number,
wherein the aperture control unit controls the diaphragm value so that an F-number does not exceed the predetermined F-number.

6. An imaging apparatus comprising:
an imaging optical system;
an image sensor;
a hardware processor; and
a memory for storing instructions to be executed by the hardware processor, wherein, when the instructions stored in the memory are executed by the hardware processor, the imaging apparatus functions as:
an angle control unit configured to control the imaging optical system or the image sensor to change a tilt angle formed by a plane orthogonal to an optical axis of the imaging optical system and an imaging plane of the image sensor;
a vibration detection unit configured to detect a vibration of the imaging apparatus;
a zoom control unit configured to control an optical zoom value; and
a calculation unit configured to calculate a change amount of a distance to an object based on the tilt angle and an output signal corresponding to the vibration detected by the vibration detection unit,
wherein the zoom control unit changes the optical zoom value, when the change amount of the distance is larger than an absolute value of a depth of field, so that the absolute value of the depth of field is larger than the change amount.

7. The imaging apparatus according to claim 6, wherein the zoom control unit calculates an angular displacement amount based on the output signal of the vibration detection unit.

8. The imaging apparatus according to claim 7, wherein the zoom control unit controls the optical zoom value to a first optical zoom value when the angular displacement amount is a first angular displacement amount, and controls the optical zoom value to a second optical zoom value on a wide-angle side of the first optical zoom value when the angular displacement amount is a second angular displacement amount larger than the first angular displacement amount.

9. The imaging apparatus according to claim 6, further comprising an electronic zoom magnification adjustment unit configured to adjust the electronic zoom magnification according to the change amount of the optical zoom value.

10. The imaging apparatus according to claim 6, further comprising a memory configured to store a predetermined optical zoom value,
wherein the zoom control unit controls the optical zoom value so that the optical zoom value does not exceed the predetermined optical zoom value.

11. The imaging apparatus according to claim 6, wherein the optical zoom value is data relating to a focal length of the imaging optical system.

12. A non-transitory computer-readable storage medium storing a computer program that causes a computer to perform a control method of an imaging apparatus that includes an imaging optical system and an image sensor, the control method including:
controlling the imaging optical system or the image sensor to change a tilt angle formed by a plane orthogonal to an optical axis of the imaging optical system and an imaging plane of the image sensor;
detecting a vibration of the imaging apparatus;
controlling a diaphragm value; and
calculating a change amount of a distance to an object based on the tilt angle and an output signal corresponding to the detected vibration,
wherein the diaphragm value is changed, when the change amount of the distance is larger than an absolute value of a depth of field, so that the absolute value of the depth of field is larger than the change amount.

13. A non-transitory computer-readable storage medium storing a computer program that causes a computer to perform a control method of an imaging apparatus that includes an imaging optical system and an image sensor, the control method including:
controlling the imaging optical system or the image sensor to change a tilt angle formed by a plane orthogonal to an optical axis of the imaging optical system and an imaging plane of the image sensor;
detecting a vibration of the imaging apparatus; and
controlling an optical zoom value
calculating a change amount of a distance to an object based on the tilt angle and an output signal corresponding to the detected vibration, wherein the optical zoom value is changed, when the change amount of the distance is larger than an absolute value of a depth of field, so that the absolute value of the depth of field is larger than the change amount.

* * * * *